United States Patent

Imamura

(10) Patent No.: US 12,153,846 B2
(45) Date of Patent: Nov. 26, 2024

(54) IMAGE FORMING SYSTEM INCLUDING A PLURALITY OF IMAGE FORMING APPARATUSES WHERE THE POWER STATE IS SWITCHABLE

(71) Applicant: CANON KABUSHIKI KAISHA, Tokyo (JP)

(72) Inventor: Takeru Imamura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/366,108

(22) Filed: Aug. 7, 2023

(65) Prior Publication Data

US 2023/0393794 A1 Dec. 7, 2023

Related U.S. Application Data

(63) Continuation of application No. 17/951,538, filed on Sep. 23, 2022, now Pat. No. 11,762,614, which is a (Continued)

(30) Foreign Application Priority Data

Jan. 20, 2021 (JP) .................................. 2021-007088

(51) Int. Cl.
G06F 3/12 (2006.01)

(52) U.S. Cl.
CPC .......... *G06F 3/1292* (2013.01); *G06F 3/1221* (2013.01); *G06F 3/1229* (2013.01);
(Continued)

(58) Field of Classification Search
CPC .... G06F 3/1292; G06F 3/1221; G06F 3/1229; G06F 3/1236; G06F 3/1258; G06F 3/1286
(Continued)

(56) References Cited

U.S. PATENT DOCUMENTS 7,290,067 B2 * 10/2007 Fukunaga ............. G06F 9/4411
  710/72
7,500,026 B2 *  3/2009 Fukunaga ............. G06F 13/385
  710/72
(Continued)

FOREIGN PATENT DOCUMENTS

JP       2002123455 A    4/2002
JP       2004206621 A    7/2004
(Continued)

OTHER PUBLICATIONS

Notice of Allowance issued in U.S. Appl. No. 17/570,760 mailed Jun. 28, 2022.
(Continued)

*Primary Examiner* — Allen H Nguyen
(74) *Attorney, Agent, or Firm* — ROSSI, KIMMS & McDOWELL LLP

(57) ABSTRACT

A method for controlling an image forming system includes a shifting process in which a wireless operation unit from a sleep state to a ready state; a connection process in which the wireless operation unit connects individually to each of a first image forming apparatus and a second image forming apparatus via wireless communication without a wireless LAN router in response to the shift of the wireless operation unit to the ready state in the shifting process; and a display process in which the touch panel display displays, side by side, a first return icon to return the first image forming apparatus to a ready state and a second return icon to return the second image forming apparatus to a ready state in response to the execution of wireless communication in the connection process.

13 Claims, 12 Drawing Sheets

Related U.S. Application Data continuation of application No. 17/570,760, filed on Jan. 7, 2022, now Pat. No. 11,487,490.

(52) U.S. Cl.
CPC .......... G06F 3/1236 (2013.01); G06F 3/1253 (2013.01); G06F 3/1286 (2013.01)

(58) Field of Classification Search
USPC ........................................................ 358/1.15
See application file for complete search history.

(56) References Cited

U.S. PATENT DOCUMENTS

| | | | |
|---|---|---|---|
| 8,593,663 | B2 | 11/2013 | Yoshida |
| 9,159,007 | B2 | 10/2015 | Kumagai et al. |
| 9,407,624 | B1 | 8/2016 | Myers et al. |
| 2002/0044299 | A1 | 4/2002 | Iwase et al. |
| 2005/0179935 | A1 | 8/2005 | Ogura et al. |
| 2006/0215182 | A1 | 9/2006 | Suzuki |
| 2006/0274368 | A1 | 12/2006 | Imine |
| 2007/0263242 | A1 | 11/2007 | Takahashi |
| 2009/0064198 | A1 | 3/2009 | Kobayashi et al. |
| 2010/0225771 | A1* | 9/2010 | Yumiki ................ H04N 1/0044 348/222.1 |
| 2012/0300257 | A1 | 11/2012 | Nakajima |
| 2013/0222848 | A1* | 8/2013 | Oyasato ................ G06F 3/1261 358/1.15 |
| 2016/0188267 | A1* | 6/2016 | Nishino ................ G06F 3/126 358/1.15 |
| 2017/0104880 | A1 | 4/2017 | Shibao |
| 2018/0113655 | A1 | 4/2018 | Sawata et al. |
| 2019/0235594 | A1 | 8/2019 | Senba |
| 2021/0026579 | A1 | 1/2021 | Tanaka et al. |

FOREIGN PATENT DOCUMENTS

| | | |
|---|---|---|
| JP | 2006345102 A | 12/2006 |
| JP | 2015106369 A | 6/2015 |
| JP | 2015204034 A | 11/2015 |
| JP | 2017076189 A | 4/2017 |
| JP | 2018067260 A | 4/2018 |
| JP | 2019134267 A | 8/2019 |

OTHER PUBLICATIONS

Office Action issued in U.S. Appl. No. 17/951,538 mailed Jan. 20, 2023.

Notice of Allowance issued in U.S. Appl. No. 17/951,538 mailed May 24, 2023.

* cited by examiner

FIG 12A

|  | Standby Mode | Sleep Mode |
|---|---|---|
| POWER SUPPLY DEVICE 17 | ○ | ○ |
| CONTROLLER 10 | ○ | ○ |
| NETWORK CONNECTION PORTION 84 | ○ | ○ |
| WIRELESS CONNECTION PORTION 81 | ○ | ○ |
| IMAGE FORMING UNIT 15 | ○ | × |
| READER 14 | ○ | × |
| PROCESSING DEVICE 16 | ○ | × |
| DISPLAY PANEL 71 | ○ | × |

FIG 12B

|  | Standby Mode | Sleep Mode |
|---|---|---|
| BATTERY 57 | ○ | ○ |
| PANEL POWER SUPPLY PORTION 56 | ○ | ○ |
| PANEL CONTROLLER 20 | ○ | ○ |
| WIRELESS COMMUNICATION PORTION 91 | ○ | △ |
| TOUCH PANEL 59 | ○ | ○ |
| DISPLAY 51 | ○ | × |
| SPEAKER PORTION 53 | ○ | × |
| STATUS DISPLAY PORTION 54 | ○ | △ |

IMAGE FORMING SYSTEM INCLUDING A PLURALITY OF IMAGE FORMING APPARATUSES WHERE THE POWER STATE IS SWITCHABLE

BACKGROUND OF THE INVENTION

Field of the Invention

The present invention relates to a method for controlling an image forming system including an image forming apparatus such as an electrophotographic copying machine or an electrophotographic printer (for example, a laser beam printer, an LED printer, or the like) and a wireless operation unit that controls the image forming apparatus via wireless communication, and a wireless operation unit.

Description of the Related Art

Japanese Patent Application Laid-Open No. 2015-106369 discloses an image forming system including an image forming apparatus and an operation portion detachably attachable to the image forming apparatus. This image forming system has two operation modes, a normal mode in which the image forming system operates normally, and a power saving mode in which the power consumption of the image forming system is lower than the power consumption in the normal mode.

The operation portion has a power saving key (hardware key) for receiving an instruction input for shifting to the power saving mode or returning from the power saving mode, and the operation mode of the operation portion is synchronized with the operation mode of the image forming apparatus. In Japanese Patent Application Laid-Open No. 2015-106369, when the operation portion is set to the power saving mode, the power consumption of the image forming system is reduced by disabling a key operation other than the power saving key.

However, in the field of commercial printing or the like, one user may operate a plurality of image forming apparatuses. A portable operation portion can be used to operate a plurality of image forming apparatuses, unlike a conventional operation portion dedicated to a specific image forming apparatus. In this case, in the configuration disclosed in Japanese Patent Application Laid-Open No. 2015-106369, all connectable image forming apparatuses are returned from the power saving mode in synchronization with the return from the power saving mode of the operation portion, and an image forming apparatus not intended by the user will also be returned from the power saving mode.

SUMMARY OF THE INVENTION

A method for controlling an image forming system including
  a first image forming apparatus that has a first wireless communication unit configured to perform wireless communication and a first image forming unit configured to form an image on a sheet based on image data, and is capable of shifting to a first sleep state in which the first image forming unit does not perform image formation, and a first ready state in which power consumption is higher than that in the first sleep state and the first image forming unit does not perform image formation,
  a second image forming apparatus that has a second wireless communication unit configured to perform wireless communication and a second image forming unit configured to form an image on a sheet based on image data, and is capable of shifting to a second sleep state in which the second image forming unit does not perform image formation, and a second ready state in which power consumption is higher than that in the second sleep state and the second image forming unit does not perform image formation,
  a wireless operation unit that has a third wireless communication unit capable of performing wireless communication with the first wireless communication unit and the second wireless communication unit, a command generating unit configured to generate a first execution command to cause the first image forming unit to start performing image formation, a second execution command to cause the second image forming unit to start performing image formation, a first return command to cause the first image forming apparatus to return from the first sleep state to the first ready state, and a second return command to cause the second image forming apparatus to return from the second sleep state to the second ready state, and a touch panel display configured to receive a touch operation by a user and capable of displaying a first execution icon to transmit the first execution command to the first image forming apparatus, a second execution icon to transmit the second execution command to the second image forming apparatus, a first return icon to transmit the first return command to the first image forming apparatus, and a second return icon to transmit the second return command to the second image forming apparatus, and is capable of shifting to a third sleep state in which power is predetermined power, and a third ready state in which power consumption is higher than the predetermined power, the method comprising:
  a shifting process in which the wireless operation unit shifts from the third sleep state to the third ready state in response to a touch on the touch panel display when the wireless operation unit is in the third sleep state;
  a connection process in which the third wireless operation unit connects individually to the first wireless communication unit and the second wireless communication unit via wireless communication without a wireless LAN router in response to the shift of the wireless operation unit from the third sleep state to the third ready state in the shifting process; and
  a display process in which the touch panel display displays the first return icon and the second return icon side by side in response to the execution of the wireless communication between the third wireless communication unit and the first wireless communication unit and the wireless communication between the third wireless communication unit and the second wireless communication unit in the connection process.

Further features of the present invention will become apparent from the following description of exemplary embodiments with reference to the attached drawings.

BRIEF DESCRIPTION OF THE DRAWINGS

FIG. 12A is a table diagram illustrating an operation mode of the image forming apparatus, and FIG. 12B is a table diagram illustrating an operation mode of the remote control panel.

DESCRIPTION OF THE EMBODIMENTS

Hereinafter, embodiments of the present invention will be exemplified in detail with reference to the drawings. However, dimensions, materials, shapes, relative arrangements, and the like of components described in the following embodiments should be appropriately changed depending on the configuration of an apparatus to which the present invention is applied and various conditions. It is not intended to limit the scope of the invention to those only.

Figure 1:
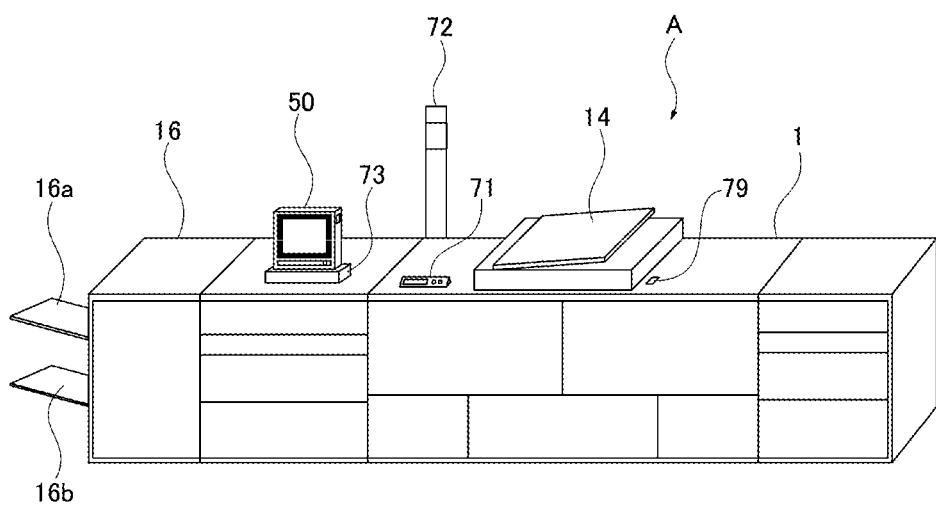
FIG. 1 is a schematic perspective view of an image forming system.
Figure 2:
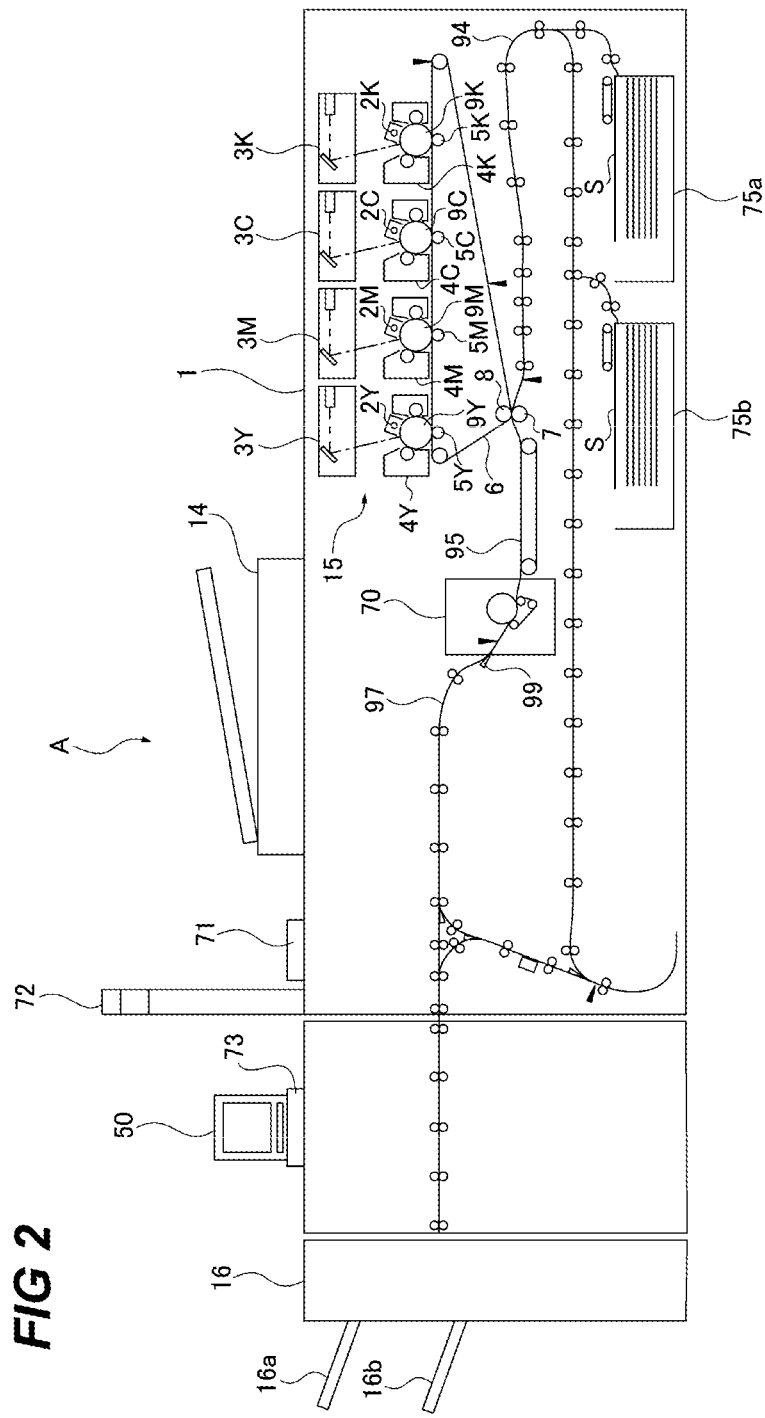
FIG. 2 is a schematic cross-sectional view of the image forming system.
Figure 3:
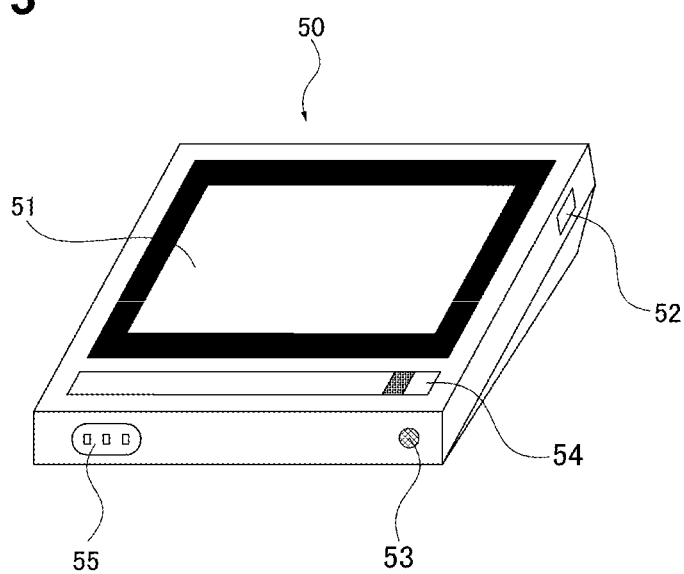
FIG. 3 is a schematic perspective view of a remote control panel.

An image forming system according to the present embodiment will be described with reference to FIGS. 1 to 3. FIG. 1 is a schematic perspective view of the image forming system. FIG. 2 is a schematic cross-sectional view of the image forming system. FIG. 3 is a schematic perspective view of a remote control panel.

<Image Forming System>

As illustrated in FIGS. 1 and 2, the image forming system A includes an image forming apparatus 1 that forms an image on a sheet S, and the remote control panel 50 (wireless operation unit) that controls the image forming apparatus 1.

<Image Forming Apparatus>

As illustrated in FIG. 1, an upper portion of the image forming apparatus 1 is provided with a reader 14 that optically reads an image of an original placed on a glass surface (not illustrated) and converts the image into image data. Further, the image forming apparatus 1 is provided with a processing device 16 that performs processes such as a stapling process, a punching process, and a bookbinding process on the sheet S on which the image is formed. The processing device 16 is an example of an optional device connected to the image forming apparatus 1. In addition to the processing device 16 provided as an example of the present embodiment, as an optional device, a cooling device may be used, which cools the sheet S on which the image is formed. That is, the optional devices referred to here refer to all devices that can be retrofitted to the image forming apparatus 1.

Further, the image forming apparatus 1 includes a seesaw type or tactile type main power switch 79 that switches a main power supply on and off. Further, the image forming apparatus 1 includes a display panel 71 that displays a lamp or an error code to notify a user of the status of the image forming apparatus 1, such as the image forming process being performed, stopped due to an error, or in the standby state. Further, the image forming apparatus 1 includes a tower type lamp 72 that notifies the user at a distant position of the status of the image forming apparatus 1 by turning on and off and blinking a light source.

Further, the image forming apparatus 1 includes a panel mounting portion 73 to which the remote control panel 50 (wireless operation unit) is detachably attachable. The remote control panel 50 will be described later.

As illustrating in FIG. 2, the image forming apparatus 1 includes an image forming unit (image forming portion) 15 that forms an image on the sheet S. The image forming unit 15 includes a photosensitive drum 9Y, 9M, 9C, 9K, a charging device 2Y, 2M, 2C, 2K, and a developing device 4Y, 4M, 4C, 4K. The image forming unit 15 includes a primary transfer roller 5Y, 5M, 5C, 5K, a laser scanner unit 3Y, 3M, 3C, 3K, an intermediate transfer belt 6, a secondary transfer roller 7, and a secondary transfer counter roller 8.

Figure 4:
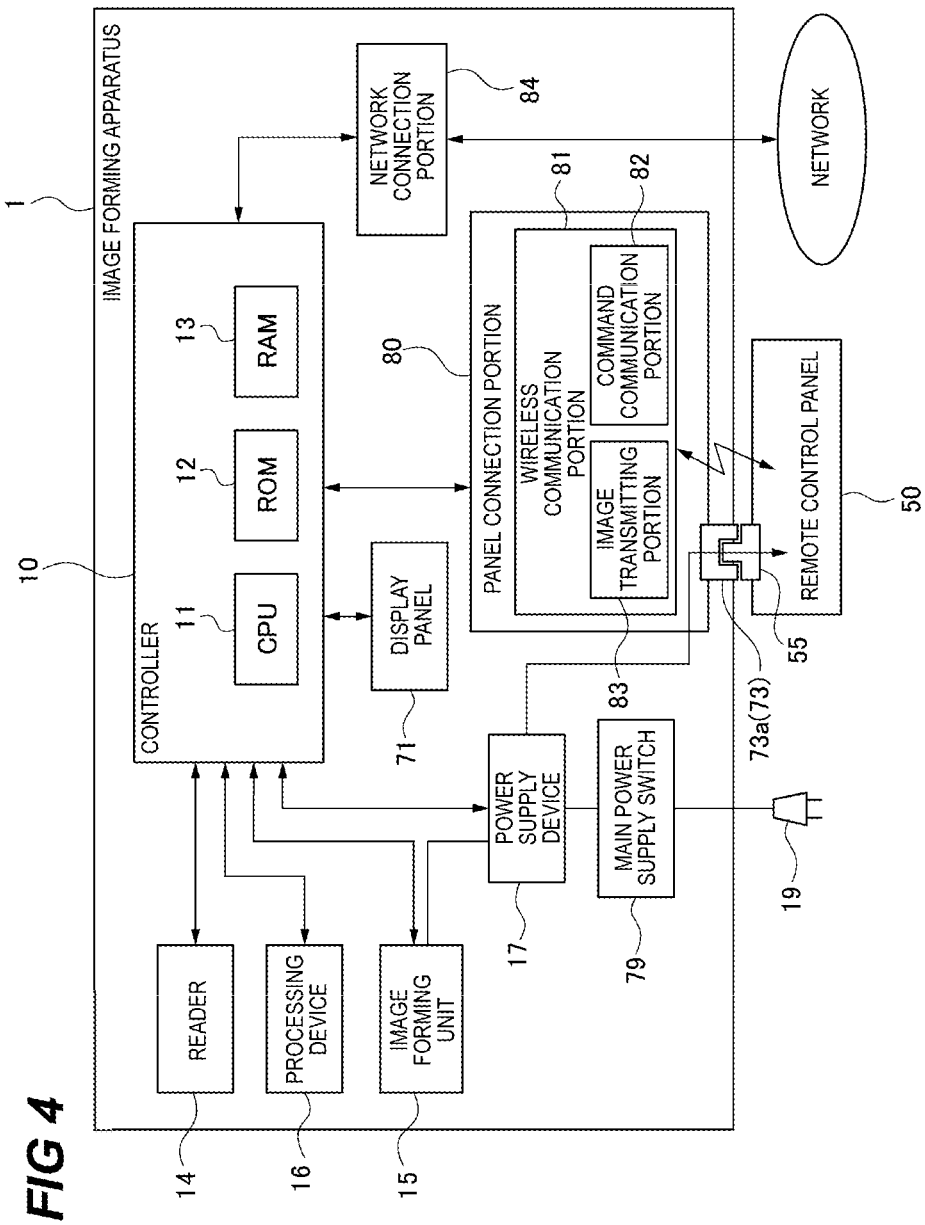
FIG. 4 is a block diagram illustrating a system configuration of an image forming apparatus.

In the case where an image is formed by the image forming apparatus 1, an image forming job is first input to a controller 10 (see FIG. 4). As a result, the sheet S stored in either a sheet cassette 75a or 75b is conveyed to a transport path 94. After that, the sheet S passes through the transport path 94 and is conveyed to a secondary transfer portion formed by the secondary transfer roller 7 and the secondary transfer counter roller 8.

On the other hand, in the image forming unit 15, first, the surface of the photosensitive drum 9Y is charged by the charging device 2Y. After that, the laser scanner unit 3Y irradiates the surface of the photosensitive drum 9Y with laser light according to the image data of the original read by the reader 14 or the image data transmitted from an external device (not illustrated) via a network, and an electrostatic latent image is formed on the surface of the photosensitive drum 9Y. The image data sent from the external device is sent to a network connection portion 84, which will be described later, via a wireless LAN router.

Thereafter, yellow toner is caused to adhere to the electrostatic latent image formed on the surface of the photosensitive drum 9Y by the developing device 4Y to form a yellow toner image on the surface of the photosensitive drum 9Y. The toner image formed on the surface of the photosensitive drum 9Y is primarily transferred to the intermediate transfer belt 6 by applying a primary transfer bias to the primary transfer roller 5Y.

By a similar process, magenta, cyan, and black toner images are also formed on the photosensitive drums 9M, 9C, and 9K. By applying the primary transfer bias to the primary transfer rollers 5M, 5C, and 5K, these toner images are transferred and superimposed on the yellow toner image on the intermediate transfer belt 6. As a result, a full-color toner image is formed on the surface of the intermediate transfer belt 6.

After that, the intermediate transfer belt 6 moves around to convey the full-color toner image to the secondary transfer portion. In the secondary transfer portion, a secondary transfer bias is applied to the secondary transfer roller 7, whereby the full-color toner image on the intermediate transfer belt 6 is transferred to the sheet S. The sheet S to which the toner image is transferred is conveyed to a fixing device 70 by a conveying belt 95. Then, the fixing device 70 heats and pressurizes the toner image to fix the toner image onto the sheet S.

Next, the sheet S on which the toner image is fixed is conveyed to the processing device 16 through a discharge path 97. When the user specifies a process such as the stapling process, the punching process, or the bookbinding process, the sheet S conveyed to the processing device 16 is discharged to a discharge tray 16a after the specified process is performed. If the user does not specify the process, the sheet S conveyed to the processing device 16 is discharged to a discharge tray 16b without being processed as it is.

<Wireless Operation Unit>

As illustrated in FIGS. 1 and 3, the remote control panel 50 (remote control portion) is detachably attachable to the panel mounting portion 73 of the image forming apparatus 1. The remote control panel 50 is configured to wirelessly communicate information with the image forming apparatus 1. Since the remote control panel 50 is not connected via a cable (wired connection), the user can freely carry it around and can control the image forming apparatus 1 at a position away from the image forming apparatus 1. In this case, the remote control panel 50 according to the present embodiment is an operation unit that issues an instruction to perform image formation to the image forming apparatus 1. That is, the image data of the original is not sent from the remote control panel 50 to the image forming apparatus 1. The image data is sent from an external terminal to the image forming apparatus 1 via the wireless LAN router, or is generated in the image forming apparatus 1 by reading the original by the reader 14. In this way, the external terminal and the image forming apparatus 1 are connected to each other via the wireless LAN router, whereas the remote control panel 50 is connected to the image forming apparatus 1 without a wireless LAN router. When the remote control panel 50 is mounted on the panel mounting portion 73, a charging connector 55 (see FIG. 3) of the remote control panel 50 is connected to a power supply connector 73a (see FIG. 5) of the panel mounting portion 73. As a result, the image forming apparatus 1 detects the connection of the remote control panel 50, and the image forming apparatus 1 charges a battery 57 (see FIG. 5) of the remote control panel 50.

Although the configuration in which the remote control panel 50 (remote control portion) is detachably attachable to the image forming apparatus 1 is exemplified, the remote control panel 50 (remote control portion) may not be detachably attachable to the image forming apparatus 1 and may be separate from the image forming apparatus 1 and configured to control the image forming apparatus 1 via wireless communication.

As illustrated in FIG. 3, the remote control panel 50 includes a power switch 52 for switching a power supply of the remote control panel 50 on and off, and a speaker portion 53 for outputting a sound. Further, the remote control panel 50 has a status display portion 54 that is turned on and off and blink to notify the user of the status of the remote control panel 50 In this case, the status display portion 54 includes an LED, but is not limited to this configuration.

Further, the remote control panel 50 has a touch panel type display 51 (display portion) in which a display portion capable of displaying information based on image data and an operation portion for detecting a touch operation from a user are integrated. By touching a key displayed on the display 51 with a finger to perform inputting, the user can set a setting relating to image formation, such as a setting for the number of sheets on which an image is to be formed and a setting for the size of the sheet S, and can set a setting relating to image reading, such as a setting for the size of the original.

Further, in the present embodiment, as an operation display portion included in the remote control panel 50, the touch panel type display 51 in which the display portion and the operation portion are integrated is exemplified. That is, the configuration in which the touch panel type display 51 is mounted on the remote control panel 50 is exemplified. However, the present invention is not limited thereto. For example, the remote control panel 50 may have a configuration in which a hardware key such as a numeric keypad or a reset key is provided as a key operation input portion separately from the display 51 (operation display portion) described above.

<System Configuration of Image Forming Apparatus>

Next, a system configuration of the image forming apparatus 1 will be described with reference to FIG. 4. FIG. 4 is a block diagram illustrating the system configuration of the image forming apparatus 1.

As illustrated in FIG. 4, the image forming apparatus 1 includes a controller 10 having a CPU 11, a ROM 12, and a RAM 13. The reader 14, the image forming unit 15, the processing device 16, the display panel 71, and the like are connected to the controller 10. Further, the controller 10 is connected to the network connection portion 84 that connects to the external device (not illustrated) via the network.

The ROM 12 (storage portion) stores various programs and various image data relating to the control of the image forming apparatus 1. The CPU 11 performs various arithmetic processing based on a control program stored in the ROM 12. The RAM 13 temporarily stores data. That is, the CPU 11 controls the reader 14, the image forming unit 15, the processing device 16, and the like connected to the controller 10 to perform the above-mentioned image forming operation while using the RAM 13 as a work area based on the control program stored in the ROM 12.

Although the configuration in which the controller 10 has the ROM 12 as the storage portion is exemplified, the present invention is not limited thereto, and the controller 10 may have storage separate from the ROM 12 as the storage portion. The storage is, for example, an HDD or an SSD, and is used for storing various data. The data stored in the storage is, for example, an image to be displayed on the remote control panel 50, print data, or the like.

The network connection portion 84 is used to receive a print instruction and print data for the image forming apparatus via the network. The network connection portion 84 is also used to receive user instructions to change a setting of the image forming apparatus and turn off the power supply from a remote location via the network by using the remote control panel 50, a PC, or a tablet. In this case, the network to which the network connection portion 84 is connected may be wired connection or wireless connection.

Further, the controller 10 is connected to a panel connection portion 80 that connects to the remote control panel 50. The panel connection portion 80 has a wireless communication portion 81 (first wireless communication unit, second wireless communication unit) that performs wireless communication between the panel mounting portion 73, which has the power supply connector 73a and to which the remote control panel 50 is connected, and the remote control panel 50. The charging connector 55 of the remote control panel 50 is connected to the power supply connector 73a of the panel mounting portion 73.

The wireless communication portion 81 includes a command communication portion 82 and an image transmitting portion 83. The CPU 11 reads an image stored in the ROM 12 (or storage) and transmits the image to the remote control panel 50 via the image transmitting portion 83 of the wireless communication portion 81. Further, the CPU 11 generates an instruction for the remote control panel 50 and transmits the instruction to the remote control panel 50 via the command communication portion 82. Further, the CPU 11 receives a notification generated by the remote control panel 50 and an instruction generated by the remote control panel 50 via the command communication portion 82. In the present embodiment, the command communication portion 82 and the image transmitting portion 83 are configured separately, but may be combined into one communication line.

The network connection portion 84 and the wireless communication portion 81 may be shared, but in that case, the Wi-Fi direct method, which is a communication mode for directly connecting the image forming apparatus and the remote control panel, cannot be used. Furthermore, the connection will be via a normal network (via an access point), and print data, command communication and screen data will be communicated via the same route. Therefore, since the amount of communication data increases, the response of the screen display on the remote control panel may become slow, and it may take time to receive the print data of the image forming apparatus. Therefore, in the present embodiment, the network connection portion 84 and the wireless communication portion 81 are configured separately.

A power supply device 17 is connected to the controller 10. The power supply device 17 receives power from a commercial power supply via an outlet plug 19, converts the power into electric power to be used by each device, and supplies the electric power to each device. Specifically, first, the power supply device 17 supplies power to the controller 10 when the main power switch 79 is switched from off to on. After that, the power supply device 17 supplies, based on an instruction of the controller power to the reader 14, the image forming unit 15, the processing device 16, the display panel 71, the remote control panel 50 mounted on the panel mounting portion 73, the wireless communication portion 81, the network connection portion 84, and the like. In this case, a line connecting the power supply device 17 and the controller 10 illustrated in FIG. 4 is a signal line. Through this signal line, the controller 10 instructs the power supply device 17 which unit to supply power to. Further, in FIG. 4, a line connecting the power supply device 17 to the image forming unit 15 is a power supply line, and power is supplied from the power supply device 17 to the image forming unit through this power supply line. Power supply lines are connected to units such as the reader 14, the processing device 16, and the display panel 71 from the power supply device 17, but are not illustrated in FIG. 4.

The power supply line extending from the power supply device 17 to the image forming unit 15 is connected to a drive source of the image forming unit 15. That is, a "state in which power is supplied from the power supply device 17 to the image forming unit 15" means that power is supplied to the drive source of the image forming unit 15, for example, a motor for rotating the photosensitive drum 9, a motor for rotating a charging roller of the charging device 2, a motor for rotating a developing roller of the developing device 4, a motor for rotating the primary transfer roller 5, a motor for rotating the intermediate transfer belt 6, a motor for rotating the secondary transfer roller 7, and the like. In a standby mode described later, power is supplied from the power supply device 17 to these drive sources. On the other hand, in a sleep mode described later, power is not supplied from the power supply device 17 to these drive sources.

Further, when the main power switch 79 is turned off, the power supply device 17 stops the supply of power based on an instruction of the controller 10 (CPU 11). Further, even when the main power switch 79 is not turned off, the power supply device 17 can turn off the main power switch 79 by stopping the supply of power based on an instruction from the controller 10 (CPU 11). The case where the main power switch 79 is turned off based on the instruction from the controller 10 (CPU 11) is, for example, when an abnormality occurs or when a power off instruction is received from the user via the network connection portion 84.

The image forming apparatus 1 can shift to a normal mode and a power saving mode that consumes less power than the normal mode, and the controller 10 (CPU 11) performs control to reduce the power consumption. Specifically, when the user selects image reading, power is supplied to the reader 14, but power is not supplied to the image forming unit 15 and the processing device 16. When the image forming apparatus is not used, unnecessary power supply is stopped even in the controller 10. The case where the image forming apparatus is not used means, for example, the case where the image forming apparatus is not used for a certain period of time or the case where the image forming apparatus receives, from the user via the remote control panel 50, an instruction to shift to the power saving mode. Then, when the mode shifts to the power saving mode, power is supplied only to user-input portions such as the network connection portion 84 and the panel connection portion 80. In order to reduce the power consumption, the supply of power to the panel connection portion 80 may be stopped to limit user input to input from the network connection portion 84. In that case, it is necessary to change the control such that the network connection portion 84 and the remote control panel 50 communicate with each other. When input from the user is detected in the power saving mode, the image forming apparatus 1 is returned from the power saving mode to the normal mode via the controller 10 (CPU 11).

<Various Power Modes of Image Forming Apparatus>

FIG. 12A is a table diagram summarizing the types of components to which the power supply device 17 supplies power in the image forming apparatus 1 for each of the modes. The power modes of the image forming apparatus will be described below with reference to FIG. 12A.

<Normal Mode (Standby Mode)>

When the image forming apparatus is in the normal mode, the power supply device 17 supplies power to the controller 10. After that, the power supply device 17 supplies power to, for example, the drive source of the image forming unit 15 based on an instruction of the controller 10. When the remote control panel 50 is mounted on the panel mounting portion 73, the power supply device 17 supplies power to the remote control panel 50 mounted on the panel mounting portion 73. In the normal mode, the image forming unit 15 performs image formation when the wireless communication portion 81 (first wireless communication unit, second wireless communication unit) receives an execution command (first execution command, second execution command). That is, in the normal mode, the image forming apparatus can receive the execution command.

<Power Saving Mode (Sleep Mode)>

On the other hand, when the image forming apparatus shifts from the normal mode to the power saving mode, the power supply device 17 supplies power to the wireless communication portion 81 and the network connection portion 84 based on an instruction of the controller 10. However, the power supply device 17 stops, based on an instruction of the controller 10, supplying power to the drive source of the image forming unit 15 to which power was supplied in the normal mode. When the remote control panel 50 is mounted on the panel mounting portion 73, the power supply device 17 supplies power to the remote control panel 50 mounted on the panel mounting portion 73. In the power saving mode, unlike the normal mode, the image forming apparatus does not receive an execution command. The power saving mode in the present embodiment is not only configured such that the wireless communication portion 81 does not accept the execution command, but also configured such that the wireless communication portion 81 receives the execution command but the image forming unit 15 does not perform image formation.

<System Configuration of Remote Control Panel>

Figure 5:
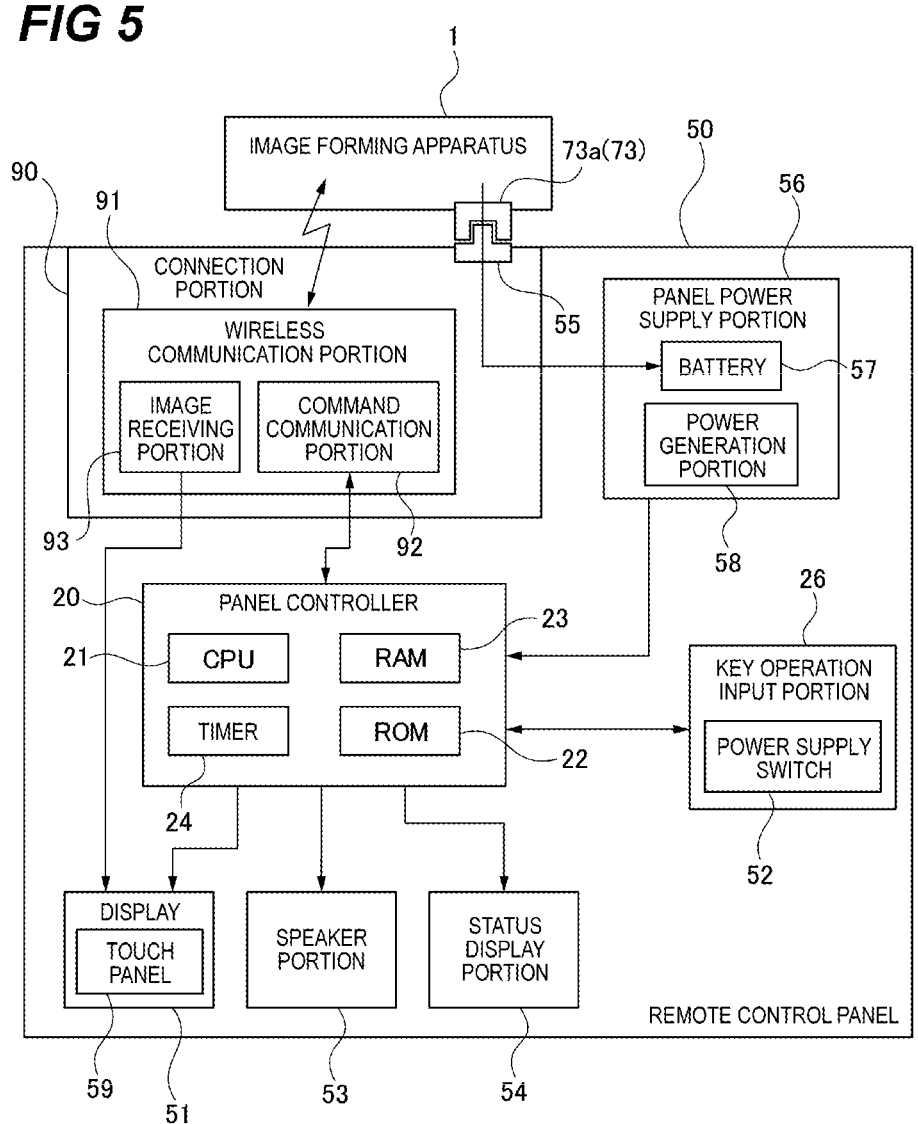
FIG. 5 is a block diagram illustrating a system configuration of the remote control panel.

Next, the system configuration of the remote control panel 50 will be described with reference to FIG. 5. FIG. 5 is a block diagram illustrating the system configuration of the remote control panel 50.

As illustrated in FIG. 5, the remote control panel 50 includes a panel controller having a CPU 21 (controller), a ROM 22, a RAM 23, and a timer 24. The timer 24 clocks when the panel controller 20 performs various processes.

The ROM 22 (storage portion) stores data such as various programs relating to the control of the remote control panel 50. The CPU 21 performs various arithmetic processing based on a control program stored in the ROM 22. RAM23 temporarily stores data. That is, the CPU 21 (controller) controls the display 51, the speaker portion 53, the status display portion 54, and the like connected to the panel controller 20 while using the RAM 23 as a work area based on the control program stored in the ROM 22. The ROM 22 stores data necessary for control when the remote control panel 50 returns from a second power mode to a first power mode, in addition to the control program and various settings of the image forming apparatus. The necessary data is, for example, information of a list of connectable image forming apparatuses, data to be output to the display 51, and the like.

The ROM 22 can also store an SSID (identification information) and a password that are used to connect the remote control panel 50 to each image forming apparatus via wireless communication. For example, before the remote control panel 50 and the image forming apparatus are connected to each other via wireless communication for the first time, the user operates the remote control panel 50 and stores the SSID and the password in the ROM 22 in advance. Alternatively, the ROM 22 may automatically store the aforementioned information at the first wireless connection. The memory 22 stores, for example, a password (first password) required for wirelessly connecting the remote control panel 50 to a first image forming apparatus and an SSID (first identification information) of the first image forming apparatus in association with each other. Similarly, the memory 22 stores, for example, a password (second password) required for wirelessly connecting the remote control panel 50 to a second image forming apparatus and an SSID (second identification information) of the second image forming apparatus in association with each other.

Further, the remote control panel 50 includes a connection portion 90 for connecting to the image forming apparatus 1. The connection portion 90 includes a charging connector 55 connected to the power supply connector 73a of the image forming apparatus 1 and a wireless communication portion 91 (third wireless communication unit) that performs wireless communication with the image forming apparatus 1. The remote control panel 50 in the present embodiment can perform wireless communication with a plurality of image forming apparatuses. For example, an image forming system is assumed, which includes a certain image forming apparatus (first image forming apparatus), another image forming apparatus (second image forming apparatus), and the remote control panel 50. In this image forming system, the wireless communication portion 91 (third wireless communication unit) of the remote control panel 50 performs wireless communication individually with each of a first wireless communication unit of the first image forming apparatus and a second wireless communication unit of the second image forming apparatus. Specifically, direct communication is performed in order using the Wi-Fi direct communication method. However, the direct communication referred to here refers to wireless communication performed without a wireless LAN router, and is not limited to the Wi-Fi direct communication method.

The wireless communication portion 91 has a command communication portion 92 connected to the CPU 21 and an image receiving portion 93 connected to the display 51. The CPU 21 generates an instruction and a notification for the image forming apparatus 1 and transmits the instruction and the notification to the command communication portion 82 of the image forming apparatus 1 via an antenna (not illustrated) of the command communication portion 92. Further, the CPU 21 receives an instruction and information transmitted from the command communication portion 82 of the image forming apparatus 1 via the command communication portion 92.

The image receiving portion 93 receives image data transmitted from the image transmitting portion 83 of the image forming apparatus 1 via the antenna (not illustrated), converts the image data into image data to be displayed on the display 51, and displays the image data on the display 51. In the present embodiment, the command communication portion 92 and the image receiving portion 93 have been described as portions separate from each other, but may be combined into one communication line.

Figure 6A:
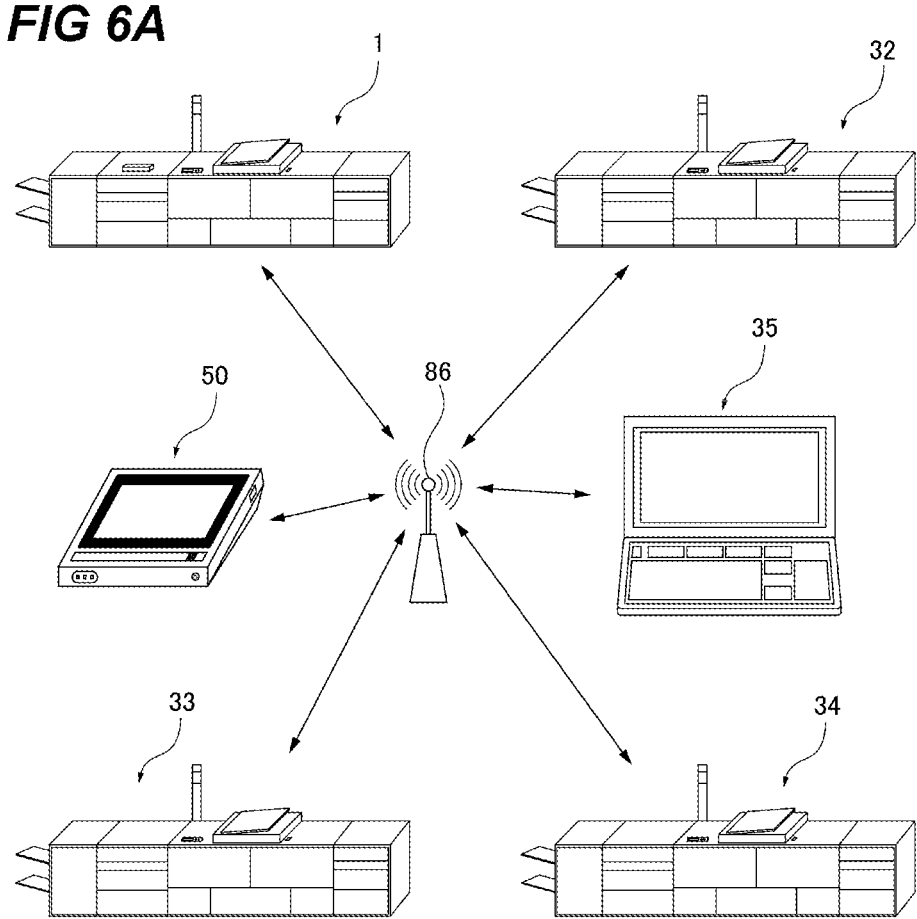
FIGS. 6A and 6B are configuration diagrams of the entire image forming system.
Figure 6B:
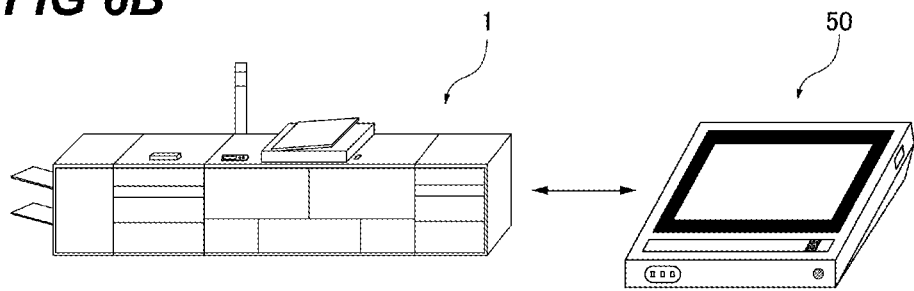

Further, the wireless communication portion 91 performs wireless communication via the wireless communication portion 81 of the image forming apparatus 1 by Wi-Fi direct communication, which is a communication mode for directly connecting the image forming apparatus to the remote control panel (see FIG. 6B). Miracast, which is a display transmission technology that applies this Wi-Fi direct communication method, is used in, for example, mobile phones, displays, projectors, and the like. The communication mode for directly connecting the image forming apparatus 1 to the remote control panel 50 may be a mode in which wireless communication is performed by another method such as Bluetooth or NFC instead of wireless communication by Wi-Fi. Further, the wireless communication portion 91 performs wireless communication in a communication mode for connecting the remote control panel 50 to the image forming apparatus via the network connection portion 84 of the image forming apparatus that can be connected via the access point 86 (for example, a Wi-Fi router) (see FIG. 6B). Based on an instruction of the CPU 21, the wireless communication portion 91 switches between a communication mode for directly connecting the remote control panel to the image forming apparatus and a communication mode for connecting the remote control panel to the image forming apparatus via the access point 86 and performs wireless communication.

The display 51 is a display portion capable of displaying information stored in advance in the ROM 22 (storage portion) or information received from the image forming apparatus via the wireless communication portion 91. Therefore, the CPU 21 switches an image to be output to the display 51 between an image held in the remote control panel 50 and an image received via the wireless communication portion 91. The output image may be received by the CPU 21 and output after switching or an output image selector may be provided outside the CPU 21 and switch the output image. In this case, the "information stored in advance" in the ROM 22 is, for example, the model number or name of each POD machine. In general, as a case in which the user purchases the image forming system A, first, a case in which the image forming apparatus 1 and the remote control panel 50 are purchased as a set can be considered. In this case, the model number and the name of the image forming apparatus 1 purchased as a set are registered in advance in the ROM 22 of the remote control panel 50. The timing for registering the model number and the name in the ROM 22 may be before the image forming apparatus 1 and the remote control panel 50 are shipped from a factory or when the image forming apparatus 1 is installed in a user's workplace or the like. After the image forming apparatus 1 is installed in the user's workplace or the like, a service person may register the model number and the name of the image forming apparatus 1 in the ROM 22. Of course, these registration operations may be performed by the user himself.

Further, the above-mentioned registration operations may be performed while the image forming apparatus 1 is used. Specifically, first, the user or the service person connects the image forming apparatus 1 to the network. After that, by connecting the remote control panel 50 to the network, it is possible to search for the image forming apparatus 1 that can be wirelessly connected. The model number, name, IP address, and the like of the searched image forming apparatus 1 are displayed on the display 51 of the remote control panel 50. The user compares the model number and name of the image forming apparatus 1 that are recognized by the user with the model number and name displayed on the display 51. When the model number and the name that are recognized by the user match the model number and name displayed on the display 51, the user touches the display 51 or the like to perform the registration operations. The operation of additionally registering, in the ROM 22, the model numbers and names of the second and subsequent image forming apparatuses purchased is also performed by the above procedure.

Further, as described above, the display 51 is a touch panel type display (operation display portion) in which the display portion and the touch panel 59, which is an operation portion for detecting a touch operation from the user, are integrated. The display 51 is arranged such that the touch panel 59 overlaps the display 51, and the user operates the display 51 by touching the display 51 via the touch panel 59 with a finger.

Figure 7A:
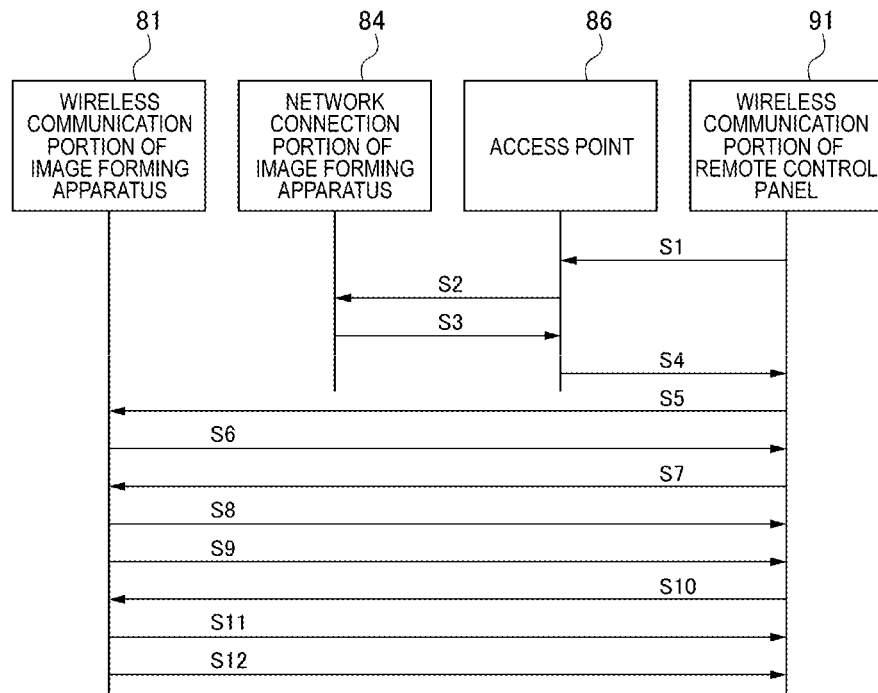
FIG. 7A is a diagram of communication transition between the image forming apparatus and the remote control panel.
Figure 7B:
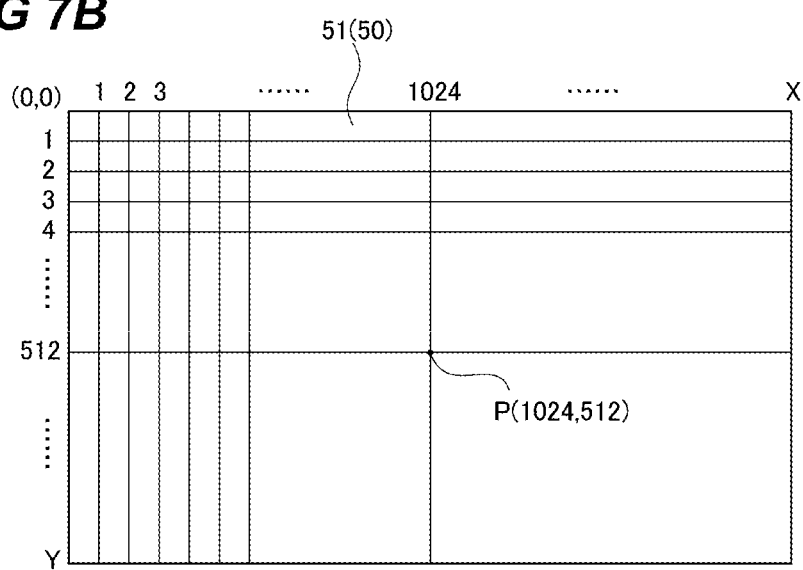
FIG. 7B is a diagram in which coordinates are displayed on the touch panel of the remote control panel.

In this case, when the user operates the touch panel 59, the CPU 21 of the remote control panel 50 transmits information of the operation of the touch panel 59 to the image forming apparatus 1 as coordinate information. This will be described below. FIG. 7B is a diagram in which coordinates are displayed on the touch panel 59 of the remote control panel 50. As illustrated in FIG. 7B, the touch panel 59 is divided in an X direction and a Y direction. Although the number of divided sections depends on the touch panel method or the like, the resistance type touch panel of the present embodiment is divided into 2048 sections in the X direction and 1024 sections in the Y direction.

Coordinates are represented by (X, Y) according to the distance from the origin with reference to the origin (0, 0). For example, a position P illustrated in FIG. 7B is expressed as coordinates (1024, 512) since the position P is 1024 away from the origin in the X direction and 512 away from the origin in the Y direction. The coordinate data is transmitted from the touch panel 59 (see FIG. 5) to the CPU 21 of the remote control panel 50, and is transmitted from the command communication portion 92 to the image forming apparatus 1 according to an instruction of the CPU 21. In the present embodiment, data that is communicated between the image forming apparatus 1 and the remote control panel 50 has an 8-bit length, and the numerical values of the coordinate data are converted into ⅛ of the values and transmitted. That is, when the coordinates are (1024, 512), the coordinates are converted into (128, 64) and transmitted.

Further, the remote control panel 50 includes a panel power supply portion 56. The panel power supply portion 56 includes a battery 57 and a power generation portion 58. The battery 57 is a main power supply of the remote control panel 50 and is a rechargeable battery. When the charging connector 55 is connected to the power supply connector 73a of the image forming apparatus 1, power is supplied from the power supply device 17 of the image forming apparatus 1 to the battery 57, and the battery 57 is charged. Further, the power generation portion 58 adjusts the power of the battery 57 to a voltage that can be used by each device included in the remote control panel 50. When the power supply of the power switch 52 is switched from off to on, the power adjusted by the power generation portion 58 is supplied to the panel controller 20, the display 51, the speaker portion 53, the status display portion 54, and the connection portion 90.

Further, the remote control panel 50 includes a key operation input portion 26 in addition to the touch panel type display 51 which is an operation display portion. The key operation input portion 26 is a hardware key provided in an area other than the display 51 of the remote control panel 50. The key operation input portion 26 has the power switch 52 that switches the power of the remote control panel 50 on and off as a hardware key.

The remote control panel 50 can shift to a first power mode and a second power mode in which power consumption is lower than that in the first power mode, and the panel controller 20 (CPU21) performs control to reduce the power consumption. The CPU 21 stops the image output to the display 51 and the power supply to the display 51 when no input is given on the remote control panel 50 for a certain period of time or when the user instructs the remote control panel 50 to shift to the second power mode.

In addition, the CPU 21 may determine that the CPU 21 is instructed to shift to the second power mode when the power switch 52 is pressed. In that case, it is necessary to distinguish between an instruction to turn off the power supply of the remote control panel 50 and an instruction to shift to the second power mode according to the time when the power switch 52 is pressed. For example, the CPU 21 distinguishes between the instruction to turn off the power supply when the power switch 52 is pressed for 5 seconds or more, and the instruction to shift to the second power mode when the power switch 52 is pressed for less than 5 seconds. In this case, when the instruction to turn off the power supply is given, confirmation of power-off may be displayed on the display 51. The method for switching the communication between the CPU 21 and the image forming apparatus 1 when the CPU 21 shifts to the second power mode will be described later.

When the remote control panel 50 detects user input to the remote control panel 50 when the remote control panel 50 is in the second power mode, the CPU 21 returns (shifts) to the first power mode. The user input is, for example, the input of the touch panel 59 or the pressing of the power switch 52. Even in the case where the power switch 52 is pressed to shift the remote control panel 50 to the first power mode, when the power switch 52 is pressed (continuously pressed for a certain period of time) for 5 seconds or more, the CPU 21 turns off the power supply of the remote control panel 50 or causes the display 51 to display a confirmation of power off. When the CPU 21 detects the user input and shifts the remote control panel 50 to the first power mode, the CPU 21 displays the image stored in the ROM 22 on the display 51. The image displayed on the display 51 in this case will be described later, but a list of image forming apparatuses to which the remote control panel 50 can be connected is displayed. Then, the CPU 21 determines an image forming apparatus selected by the user from coordinates input from the touch panel 59, and transmits an instruction to return the selected target image forming apparatus from the power saving mode to the normal mode to the selected target image forming apparatus via the wireless communication portion 91.

<Various Power Modes of Remote Control Panel>

FIG. 12B is a table diagram summarizing the types of components to which the battery 57 supplies power in the remote control panel 50 for each mode. The various power modes of the remote control panel 50 will be described below with reference to FIG. 12B.

<First Power Mode (Standby Mode)>

When the remote control panel 50 is in the first power mode, the battery 57 supplies power to the panel power supply portion 56, the panel controller 20 (CPU 21), the wireless communication portion 91, the touch panel 59, the display 51, the speaker portion 53, and the status display portion 54. That is, the battery 57 supplies power to all the components of the remote control panel 50. With the start of the power supply, each component is activated and ready for use.

<Second Power Mode (Sleep Mode)>

When the remote control panel 50 shifts from the first power mode to the second power mode (power saving mode), the battery 57 supplies power to the panel power supply portion 56, the panel controller 20 (CPU 21), the wireless communication portion 91, the touch panel 59, and the status display portion 54. However, the battery 57 stops, based on an instruction of the CPU 21, supplying power to the display 51 and the speaker portion 53 to which the battery 57 has supplied power in the first power mode.

As described with "A" in FIG. 12B, in the second power mode, power is supplied from the battery 57 to the wireless communication portion 91 and the status display portion 54 in a certain case, and is not supplied from the battery 57 to the wireless communication portion 91 and the status display portion 54 in another case. For example, in the second power mode, the user can set a setting to switch whether or not the battery 57 supplies power to the wireless communication portion 91 and whether or not the battery 57 supplies power to the status display portion 54. In this way, it is possible to perform a setting that further reduces the power consumption in the second power mode.

A specific example of supplying (not supplying) power from the battery 57 to the wireless communication portion 91 and supplying (not supplying) power from the battery 57 to the status display portion 54 will be described.

In the second power mode, whether or not power should be supplied to the wireless communication portion 91 depends on, for example, whether or not the remote control panel 50 is to be activated from the image forming apparatus 1. This is because it is necessary to supply power to the wireless communication portion 91 in order to send a communication request from the image forming apparatus 1 to the remote control panel 50 and establish a state in which wireless communication is possible.

The status display portion 54 is, for example, an LED, and the ON/OFF of the remote control panel 50 is notified by turning on/off the LED. In the second power mode, whether or not power should be supplied to the status display portion 54 can be determined by, for example, viewing the remote control panel 50 in the off state and determining whether or not the power ON/OFF is to be known. Some users want to know about power ON/OFF even in the second power mode to prevent the users from accidentally pressing the power switch even though the power is ON. On the other hand, since the display 51 is immediately turned on by touching the touch panel 59, some people think that the function of the status display portion 54 is unnecessary.

Further, the status display portion 54 may blink or the like to notify the user whether or not an error has occurred in the image forming apparatus 1. In this case, even in the second power mode, it is necessary to supply power from the battery 57 to the status display portion 54. In this case, it is also necessary to supply power to the wireless communication portion 91 from the battery 57. This is because it is necessary to inform the remote control panel 50 whether or not the image forming apparatus 1 is in an error state via wireless communication.

For the above reasons, the remote control panel 50 in the present embodiment allows the user to freely perform a setting to switch whether or not to supply power from the battery 57 to the wireless communication portion 91 and the status display portion 54 even in the second power mode.

On the other hand, in the present embodiment, power is not supplied to the display 51 and the speaker portion 53 from the battery 57 in the second power mode. By doing so, it is possible to suppress the power consumption of the remote control panel 50.

<Communication Mode Between Image Forming Apparatus and Remote Control Panel>

Next, a communication mode between the image forming apparatus and the remote control panel for operating the image forming apparatus via wireless communication will be described with reference to FIGS. 6A and 6B. FIGS. 6A and 6B are configuration diagrams of the entire image forming system according to the present embodiment. FIG. 6A is a diagram illustrating a communication mode between a plurality of image forming apparatuses 32 to 34 including the image forming apparatus 1 and the remote control panel 50. FIG. 6B is a diagram illustrating a communication mode between the image forming apparatus 1 and the remote control panel 50.

In the communication mode illustrated in FIG. 6A, the remote control panel 50, the image forming apparatuses 1 and 32 to 34, and a PC 35 are connected to each other via the access point 86. The user selects an image forming apparatus to be used from among the image forming apparatuses 1 and 32 to 34, and submits a print job from the PC 35 to the selected image forming apparatus. In the communication mode illustrated in FIG. 6A, all the image forming apparatuses 1 and 32 to 34 and the PC 35 are wirelessly connected to each other, but may be connected to each other via cables by using a LAN hub that can be connected to the access point 86.

Further, in the communication mode illustrated in FIG. 6A, the remote control panel 50 is not connected to a specific image forming apparatus at the time of the activation and upon returning from the second power mode to the first power mode. That is, even when the remote control panel 50 returns from the second power mode to the first power mode, the remote control panel 50 does not transmit a signal to return to the normal mode to the image forming apparatus in the power saving mode.

The remote control panel 50 that has returned to the first power mode displays, on the display 51, a list of connectable image forming apparatuses stored in advance in the internal ROM 22. Then, the remote control panel 50 is connected to the image forming apparatus selected from the list displayed on the display 51 via the access point 86, and transmits an instruction (return signal) to return from the power saving mode to the normal mode. In this case, the remote control panel 50 transmits the signal to the transmission destination based on the information held in the remote control panel 50. Specifically, the signal to return to the normal mode is transmitted to an IP address corresponding to the image forming apparatus selected from the list. When the image forming apparatus selected from the list is already in the normal mode, the connection may be started without the transmission of the instruction (return signal) to return from the power saving mode to the normal mode.

On the other hand, in the communication mode illustrated in FIG. 6B, the connection between the remote control panel 50 and the image forming apparatus is switched from the connection via the access point 86 illustrated in FIG. 6A to the Wi-Fi direct connection illustrated in FIG. 6B. The user can keep the connection via the access point 86, but the Wi-Fi direct connection is superior to the connection via the access point 86 in terms of responsiveness and operability of image display. Therefore, in the present embodiment, the communication method is switched from the connection via the access point 86 to the Wi-Fi direct connection.

As described above, the remote control panel 50 displays, on the display, a list of image forming apparatuses that can be connected via the access point 86 at the time of the activation or upon returning to the second power mode. The list of the connectable image forming apparatuses that is to be displayed on the display 51 is stored in advance in the ROM 22 of the remote control panel 50 by communication via the access point.

Then, when the user selects the image forming apparatus to be used from the list displayed on the display 51, the selected image forming apparatus shifts from the power saving mode to the normal mode by the connection via the access point. Then, according to a connection sequence described later, the connection between the image forming apparatus and the remote control panel 50 after the shift to the normal mode is switched to the Wi-Fi direct connection, and image data received from the image forming apparatus is displayed on the display 51.

Since the panel connection portion 80 of the image forming apparatus is used only for direct communication with the remote control panel 50, power is not supplied to the panel connection portion 80 and is supplied to only the network connection portion 84 in the power saving mode. Then, after the image forming apparatus returns to the normal mode, power is supplied to the panel connection portion 80, and the image forming apparatus connects to the remote control panel 50 via the panel connection portion 80 by the Wi-Fi direct connection. Therefore, the list of the connectable image forming apparatuses stored in advance in the ROM 22 of the remote control panel 50 is not IP addresses corresponding to the panel connection portions 80 for connection via the Wi-Fi direct connection, but is IP addresses corresponding to the network connection portions 84 (NICs) of the image forming apparatuses. Further, the IP address of the panel connection portion 80 (wireless communication portion 81) of each image forming apparatus may be stored in advance in the ROM 22 of the remote control panel 50, or may be acquired from the target image forming apparatus 1 which has returned to the normal mode.

<Wireless Communication between Image Forming Apparatus and Remote Control Panel>

Next, the wireless communication between the image forming apparatus 1 and the remote control panel 50 will be described with reference to FIG. 7A. FIG. 7A is a diagram illustrating communication transition between the image forming apparatus 1 and the remote control panel 50. In this case, a configuration in which the wireless communication portion 81 of the image forming apparatus is integrated into one communication line and a configuration in which the wireless communication portion 91 of the remote control panel 50 is integrated into one communication line are illustrated.

As described above, the CPU 21 of the remote control panel 50 returns (shifts) the remote control panel 50 to the first power mode when the remote control panel 50 detects user input to the remote control panel 50 in a state in which the remote control panel 50 is in the second power mode. That is, when the remote control panel 50 is in the second power mode (third sleep state), the remote control panel 50 shifts from the second power mode (third sleep state) to the first power mode (third ready state) in response to the user touching the display 51 (shifting process).

Then, upon returning the remote control panel 50 to the first power mode, the CPU 21 displays, on the display 51, a list of the image forming apparatuses 1 and 32 to 34 stored in the ROM 22 in advance. The image forming apparatuses 1 and 32 to 34 can be connected to the remote control panel 50 via the wireless communication portion 91. Alternatively, the wireless communication portion 91 (third wireless communication unit) connects to the wireless communication portion (corresponding to the first wireless communication unit) of the first image forming apparatus 1 via wireless communication (for example, Wi-Fi direct communication) without a wireless LAN router. Then, after the wireless communication connection between the wireless communication portion 91 and the first wireless communication unit is disconnected, the wireless communication portion 91 connects to the wireless communication portion (second wireless communication unit) of the second image forming apparatus 142 via wireless communication. In a method for communication without a wireless LAN router, such as Wi-Fi direct communication, the wireless communication portion 91 connects individually to each image forming apparatus. Therefore, to wirelessly communicate with another image forming apparatus, it is necessary to disconnect wireless communication connection to an image forming apparatus that was originally in a connected state. In this case, the process in which the wireless communication portion 91 individually connects to the wireless communication unit of each image forming apparatus via wireless communication is referred to as a connection process.

Then, the CPU 21 receives a selection instruction indicating an image forming apparatus selected by the user from the list of the connectable image forming apparatus 1 and 32 to 34 displayed on the display 51. In this case, the process of displaying the list of the connectable image forming apparatuses 1 and 32 to 34 on the display 51 is referred to as a display process. A display corresponding to each image forming apparatus on the list screen described in this example will be referred to as a return icon. When the return icon is touched, a return command is transmitted from the wireless communication portion 91 of the remote control panel 50 to the wireless communication unit of the predetermined image forming apparatus. For example, the image forming apparatus 1 (first image forming apparatus) returns from the sleep state to the ready state in response to receiving a first return command, and the image forming apparatus 32 (second image forming apparatus) returns from the sleep state to the ready state in response to receiving a second return command. In this example, in the list screen of the connectable image forming apparatuses 1 and 32 to 34 displayed on the display 51, the icon corresponding to the image forming apparatus 1 is a first return icon and the icon corresponding to the image forming apparatus 32 is a second return icon. The CPU21 is also a command generating unit that generates a return command and an execution command.

Then, the CPU 21 of the remote control panel 50 transmits an instruction (return command) to return from the power saving mode to the normal mode to the image forming apparatus selected from the aforementioned list from the wireless communication portion 91 of the remote control panel 50 to the access point 86 (S1). The return command transmitted from the wireless communication portion 91 of the remote control panel 50 is transmitted to the network connection portion 84 of the image forming apparatus selected from the aforementioned list via the access point 86 (S2).

The CPU 11 of the image forming apparatus transmits a response signal (indicating returning from the power saving mode to the normal mode) to the aforementioned instruction from the network connection portion 84 of the image forming apparatus to the access point 86 (S3). The response signal transmitted from the network connection portion 84 of the image forming apparatus is transmitted to the wireless communication portion 91 of the remote control panel 50 via the access point 86 (S4).

When the CPU 21 of the remote control panel 50 receives the response signal and detects that the image forming apparatus selected from the list has returned from the power saving mode to the normal mode, the CPU 21 performs a connection sequence with the panel connection portion 80 of the image forming apparatus. First, a negotiation request is directly transmitted from the wireless communication portion 91 of the remote control panel 50 to the panel connection portion 80 of the image forming apparatus without passing through the access point 86 (S5). When there is no problem with the negotiation request received from the panel connection portion 80, the image forming apparatus transmits a response signal from the panel connection portion 80 to the wireless communication portion 91 (S6). When the wireless communication portion 91 of the remote control panel 50 receives the response signal from the panel connection portion 80 of the image forming apparatus, communication between the remote control panel 50 and the image forming apparatus is established. Next, the panel connection portion 80 of the image forming apparatus and the wireless communication portion 91 of the remote control panel 50 mutually set communication conditions such as communication speed information and an image compression rate (S7, S8).

When the image forming apparatus and the remote control panel 50 are ready to communicate with each other, the CPU 11 of the image forming apparatus transmits the image stored in the ROM 12 (or storage) from the panel connection portion 80 to the wireless communication portion 91 (S9). In this case, the image transmitted from the target image forming apparatus selected from the list to the remote control panel 50 is an operation screen for operating the target image forming apparatus by the remote control panel 50. The wireless communication portion 91 of the remote control panel receives the image. When the wireless communication portion 91 receives the image from the target image forming apparatus, the CPU 21 switches the image displayed on the display 51 from the image stored in the ROM 22 to the image received from the target image forming apparatus and displays the received image on the display 51. Then, the remote control panel 50 transmits the coordinate information of the touch panel 59 operated by the user and the status information of the remote control panel 50 from the wireless communication portion 91 to the panel connection portion 80 (S10). The CPU 11 of the target image forming apparatus performs an action on the received information of the remote control panel 50, appropriately changes an image to an image to be transmitted via the panel connection portion 80, and transmits the image to the wireless communication portion 91 (S11). In addition to the image, the CPU 11 of the target image forming apparatus transmits a command signal to turn on/off the LED of the status display portion 54 and to turn on/off the blinking and to turn on/off the sound from the speaker portion 53 (S12).

<Mode Shifting Process of Image Forming System>

Figure 8:
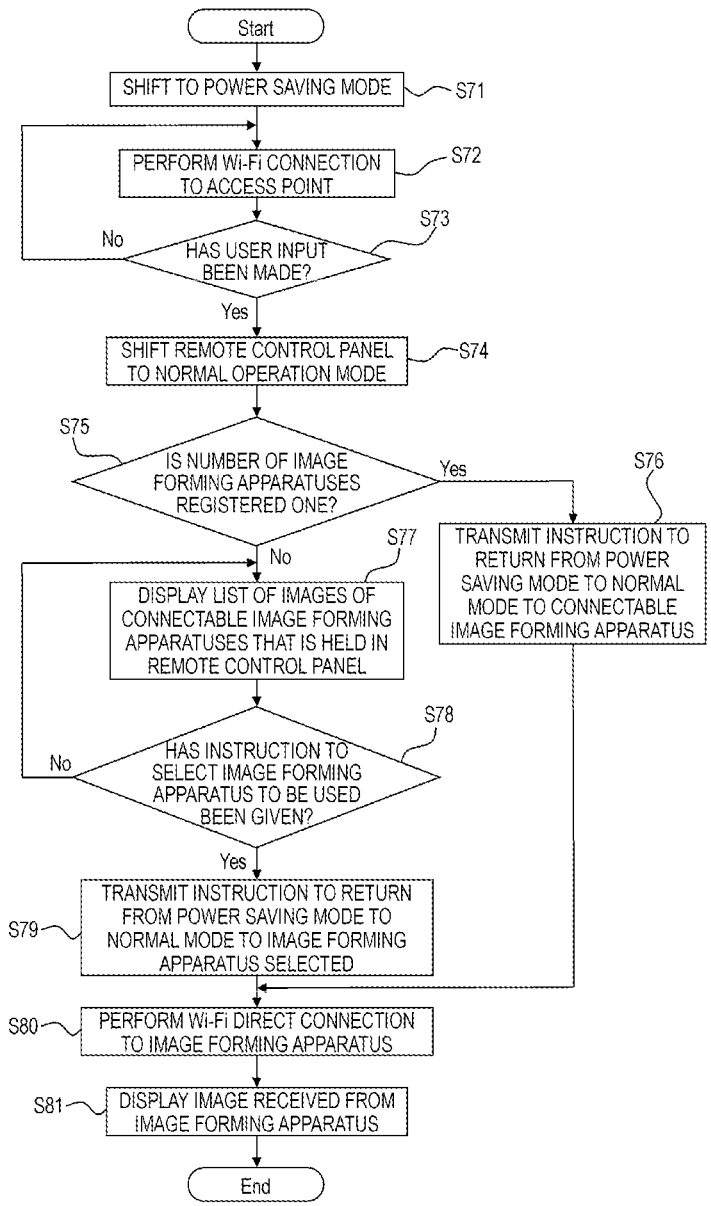
FIG. 8 is a flowchart illustrating a process procedure of the remote control panel.

Next, a mode shifting process of the image forming system will be described with reference to FIG. 8. FIG. 8 is a flowchart illustrating a process procedure from when the remote control panel 50 shifts from the first power mode to the second power mode in which power consumption is lower than the first power mode to when the remote control panel 50 is connected to the target image forming apparatus and switches an output image.

The CPU 21 (controller) of the remote control panel 50 shifts the remote control panel 50 to the power saving mode, which is the second power mode (S71). That is, the CPU 21 stops the supply of power to the display 51 and the speaker portion 53 of the remote control panel 50, to which power has been supplied in the first power mode. Further, the CPU 21 appropriately stops the supply of power to the wireless communication portion 91 and the status display portion 54.

When the remote control panel 50 shifts to the power saving mode, the CPU 21 shifts to S72 and establishes Wi-Fi connection (wireless connection) with the access point 86. When the CPU 21 connects to the access point 86, the CPU 21 shifts to S73 and determines whether or not user input to the remote control panel 50 has been made. The user input to the remote control panel 50 is input to the touch panel 59 or input to the power switch 52. When the CPU 21 determines that no user input has been made, the CPU 21 shifts to S72 and maintains the state of being connected to the access point 86 until user input is made. On the other hand, when the CPU 21 determines that user input has been made, the CPU 21 shifts to S74, shifts the remote control panel 50 from the power saving mode to the normal operation mode, which is the first power mode, and shifts to S75.

The CPU 21 determines whether or not there is only one image forming apparatus registered in the remote control panel 50 (S75). That is, the CPU 21 determines whether or not the image forming apparatus that can be connected via the wireless communication portion 91 and is stored in advance in the ROM 22 of the remote control panel 50 is the one image forming apparatus. When the connectable image forming apparatus stored in the ROM 22 of the remote control panel 50 is the one image forming apparatus, the CPU 21 automatically transmits an instruction to return from the power saving mode to the normal operation mode to the target image forming apparatus (S76) and the CPU 21 shifts to S80. The CPU 21 connects to the panel connection portion 80 of the target image forming apparatus via Wi-Fi direct communication (S80), shifts to S81, displays the image received from the target image forming apparatus, and can operate the target image forming apparatus.

On the other hand, when the number of connectable image forming apparatuses stored in the ROM 22 of the remote control panel 50 is not one in S75, that is, is two or more, the CPU 21 shifts to S77. The CPU 21 displays the list of the connectable image forming apparatuses stored in advance in the ROM 22 of the remote control panel 50 on the display 51 (S77), and shifts to S78.

The CPU 21 determines whether or not an instruction to select an image forming apparatus to be used from the list has been given from the user, and waits until user input is given. When the CPU 21 determines that the instruction to select the image forming apparatus to be used has been given, the CPU 21 shifts to S79. The CPU 21 transmits an instruction to return from the power saving mode to the normal mode to the target image forming apparatus selected in S78 (S79), and shifts to S80. The CPU 21 connects to the panel connection portion 80 of the target image forming apparatus via Wi-Fi direct communication (S80), shifts to S81, displays the image received from the target image forming apparatus, and can operate the target image forming apparatus.

By performing such control, only an image forming apparatus to be used from the remote control panel can be returned from the power saving mode to the normal mode in the image forming system in which the plurality of image forming apparatuses is operated via wireless communication from the remote control panel.

<Display Example of Image on Remote Control Panel>

Next, a display example of the list of the connectable image forming apparatuses stored in the ROM 22 in advance and displayed on the display 51 of the remote control panel 50 will be described with reference to FIGS. 9A to 11. FIGS. 9A to 11 are diagrams illustrating display examples of an operation screen (list of the connectable image forming apparatuses stored in advance in the ROM 22) stored in the ROM 22 in advance and displayed on the display 51 of the remote control panel 50.

Figure 9A:
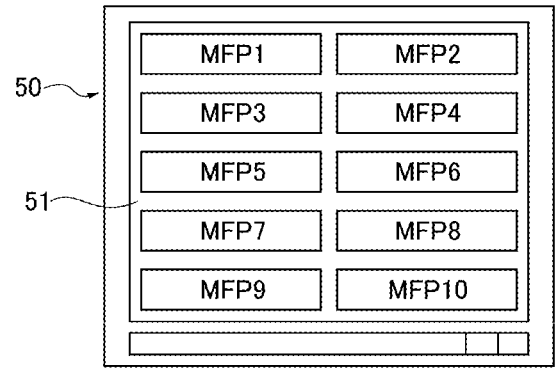
FIGS. 9A, 9B, and 9C are diagrams illustrating examples of an operation screen displayed on a display of the remote control panel.

The list displayed on the display 51 of the remote control panel 50 illustrated in FIG. 9A is an operation screen in which buttons for each of a plurality of image forming apparatuses connectable via the wireless communication portion 91 are displayed side by side.

Figure 9B:
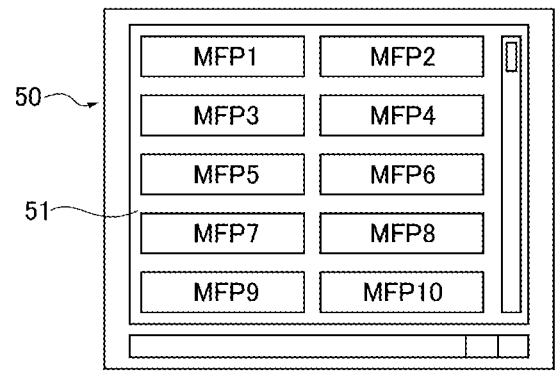

The list displayed on the display 51 of the remote control panel 50 illustrated in FIG. 9B is an operation screen having a display configuration capable of scrolling when the list cannot be displayed in one screen on the display 51.

When the button of an image forming apparatus to be used is selected from the operation screen, the remote control panel 50 illustrated in FIGS. 9A and 9B transmits, to the image forming apparatus corresponding to the selected button, an instruction to return from the power saving mode to the normal mode.

Figure 9C:
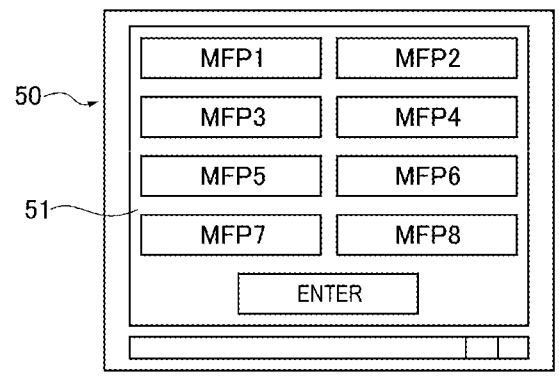

The list displayed on the display 51 of the remote control panel 50 illustrated in FIG. 9C is an operation screen in which a button for each of a plurality of image forming apparatuses that can be connected via the wireless communication portion 91, and an enter button for determination after the selection of the button are displayed.

When the enter button is pressed after the button of the image forming apparatus to be used is selected from the operation screen, the remote control panel 50 illustrated in FIG. 9C transmits, to the image forming apparatus corresponding to the selected button, an instruction to return from the power saving mode to the normal mode.

Figure 10A:
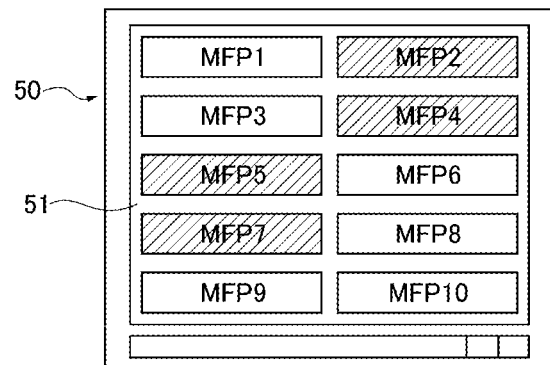
FIGS. 10A, 10B, and 10C are diagrams illustrating examples of an operation screen displayed on the display of the remote control panel.

The list displayed on the display 51 of the remote control panel 50 illustrated in FIG. 10A is an operation screen in which a button of an image forming apparatus that cannot be used among the plurality of image forming apparatuses connectable via the wireless communication portion 91 is displayed in a non-selectable manner and a button of an image forming apparatus that can be used among the plurality of image forming apparatuses connectable via the wireless communication portion 91 is displayed in a selectable manner. On the operation screen of the remote control panel 50 illustrated in FIG. 10A, buttons of image forming apparatuses that cannot be used are displayed in gray-out state, buttons of image forming apparatuses that can be used are displayed in white, and an image forming apparatus can be selected only from among the image forming apparatuses that can be used. The image forming apparatuses that cannot be used are, for example, not in an on state, otherwise they have a failure such as an error.

When the button of the image forming apparatus to be used is selected from the image forming apparatuses that can be used in the operation screen, the remote control panel 50 illustrated in FIG. 10A transmits, to the image forming apparatus corresponding to the selected button, an instruction to return from the power saving mode to the normal mode. The remote control panel 50 illustrated in FIG. 10A does not transmit the instruction even when a button of an image forming apparatus that cannot be used is selected from the operation screen.

Figure 10B:
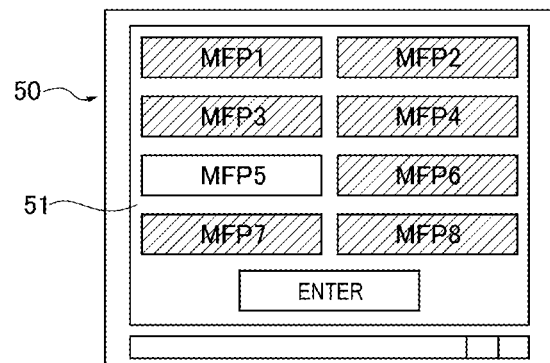

The list displayed on the display 51 of the remote control panel 50 illustrated in FIG. 10B is an operation screen in which the button of the previously used image forming apparatus is selected from among the plurality of image forming apparatuses that can be connected via the wireless communication portion 91 and the buttons of the other image forming apparatuses are deselected.

When the image forming apparatus to be used is the image forming apparatus used last time, the button has already been selected. Therefore, when the enter button is pressed, the remote control panel 50 illustrated in FIG. 10B transmits, to the image forming apparatus used last time, an instruction to return from the power saving mode to the normal mode. Further, the remote control panel 50 illustrated in FIG. 10B can deselect the previously used image forming apparatus when the button corresponding to the previously used image forming apparatus is pressed again from the operation screen, and newly select another image forming apparatus when a button corresponding to the image forming apparatus is selected.

Figure 10C:
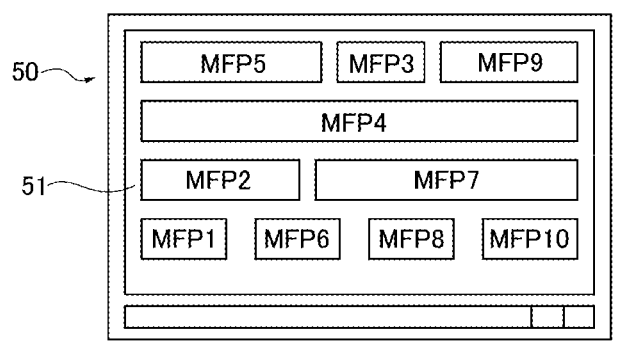

The list displayed on the display 51 of the remote control panel 50 illustrated in FIG. 10C is an operation screen in which buttons corresponding to the plurality of image forming apparatuses that can be connected via the wireless communication portion 91 are displayed side by side according to arrangement information. The arrangement information of the plurality of image forming apparatuses that can be connected via the wireless communication portion 91 is stored in advance in the ROM 22 that is the storage portion.

Further, the list displayed on the display 51 of the remote control panel 50 illustrated in FIG. 10C is an operation screen in which the buttons corresponding to the plurality of image forming apparatuses that can be connected via the wireless communication portion 91 are displayed according to the sizes of the image forming apparatuses. The sizes of the plurality of image forming apparatuses that can be connected via the wireless communication portion 91 are stored in advance in the ROM 22 that is the storage portion. In the operation screen of the remote control panel 50 illustrated in FIG. 10C, MFPs 1, 6, 8 and 10 are lined up in the foreground, and MFPs 5, 3 and 9 are lined up in the back. Although differences between the sizes of the buttons indicate differences between the sizes of the image forming apparatuses (MFPs), the buttons may have the same size and may be displayed.

Figure 11:
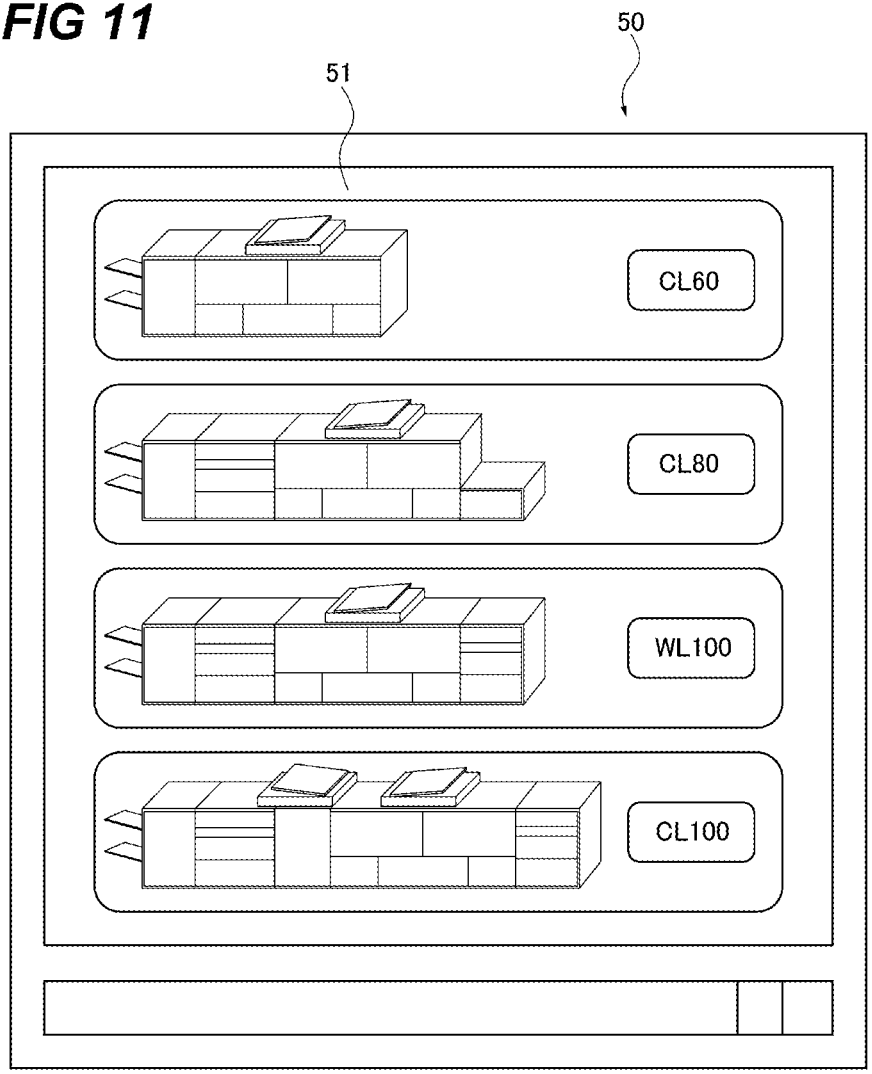
FIG. 11 is a diagram illustrating an example of an operation screen displayed on the display of the remote control panel.

The list displayed on the display 51 of the remote control panel 50 illustrated in FIG. 11 is an operation screen in which configurations and product names are displayed in the buttons of the plurality of image forming apparatuses that can be connected via the wireless communication portion 91. The configurations and product names of the plurality of image forming apparatuses that can be connected via the wireless communication portion 91 are stored in advance in the ROM 22 that is the storage portion.

In this way, it is also possible to select an image forming apparatus according to conditions for use so that the arrangement, configurations, and product names can be understood. Further, a display or the like in which a usable image forming apparatus can be understood from a simple list display may be displayed.

When the button of the image forming apparatus to be used is selected from the operation screen, the remote control panel 50 illustrated in FIGS. 10C and 11 transmits, to the image forming apparatus corresponding to the selected button, an instruction to return from the power saving mode to the normal mode.

In this way, when the remote control panel 50 returns from the power saving mode to the normal operation mode, the remote control panel 50 displays a list of connectable image forming apparatuses, so that only the image forming apparatus to be used can be selected from the remote control panel and return from the power saving mode to the normal mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-007088, filed Jan. 20, 2021, which is hereby incorporated by reference herein in its entirety.

What is claimed is:

1. An image forming system comprising:
a plurality of image forming apparatuses each configured to operate in a plurality of power modes where power consumptions are different from each other; and
a wireless operation unit including a touch panel configured to receive an operation setting command from a user with a touch operation by the user,
wherein the wireless operation unit is configured to:
wirelessly communicate with each of the plurality of image forming apparatuses;
display the plurality of image forming apparatuses wirelessly communicating with the wireless operation unit and permit the user to select at least one image forming apparatus from among the displayed plurality of image forming apparatuses with the touch operation; and
send a control signal instructing the selected at least one image forming apparatus to change the power mode thereof.

2. The image forming system according claim 1, wherein:
the wireless operation unit is switchable between one power mode where the power consumption is set at a predetermined amount and another-fourth power mode where the power consumption is smaller than the one power mode, and
while the wireless operation unit is in the one power mode, the one power mode of the wireless operation unit is switchable to the another power mode with the touch operation by the user.

3. The image forming system according claim 2, wherein the one and another power modes of the wireless operation unit are switchable with the touch panel by turning ON to enable the one power mode and turning OFF to enable the another power mode of the wireless operation unit.

4. The image forming system according claim 1, wherein:
the wireless operation unit is configured to transmit an operation command to the selected at least one image forming apparatus to perform the image formation,
the selected at least one image forming apparatus is configured to:
receive the operation command from the wireless operation unit while the selected at least one image forming apparatus is in a first power mode, among the plurality of power modes; and
not receive the operation command while the selected at least one image forming apparatus is in a second power mode where the power consumption is smaller than that in the first power mode, among the plurality of power modes.

5. The image forming system according claim 1, wherein:
the wireless operation unit is configured to transmit an operation command to the selected at least one image forming apparatus to perform the image formation, and
the selected at least one image forming apparatus is configured to:
perform the image formation based on the operation command while the selected at least one image forming apparatus is in a first power mode, among the plurality of power modes; and
not perform the image formation based on the operation command while the selected at least one image forming apparatus is in a second power mode where the power consumption is smaller than that in the first power mode, among the plurality of power modes.

6. The image forming system according claim 1, wherein each of the plurality of image forming apparatus communicates with the wireless operation unit by Wi-Fi direct communication.

7. The image forming system according claim 4, wherein each of the plurality of image forming apparatuses performs the image formation based on image data transmitted via a wireless LAN router after the wireless operation unit transmits the operation command wirelessly.

8. The image forming system according claim 5, wherein each of the plurality of image forming apparatuses performs the image formation based on image data transmitted via a wireless LAN router after the wireless operation unit transmits the operation command wirelessly.

9. The image forming system according claim 1, wherein the plurality of power modes includes a first power mode for image formation on a sheet and a second power mode that consumes less power than the first power mode.

10. The image forming system according claim 9, wherein the control signal instructs the plurality of imaging devices to change the power mode from the second power mode to the first power mode.

11. The image forming system according claim 10, wherein the wireless operation unit sends the control signal while the selected at least one imaging device is in the second power mode.

12. The image forming system according claim 9, wherein the wireless operation unit sends an execution signal to the selected at least one image forming device that instructs the selected at least one image forming device to start the image formation on the sheet.

13. The image forming system according claim 12, wherein:
- upon the selected at least one image forming device receiving the execution signal while in the first power mode, the image formation is performed on the sheet based on the execution signal, and
- upon the selected at least one image forming device receiving the execution signal while in the second power mode, the image formation is not performed on the sheet based on the execution signal.

\* \* \* \* \*